Aug. 18, 1931.   H. O. CARLETON   1,819,541
PHOTOGRAPHIC PRINTING APPARATUS
Filed Feb. 18, 1925   3 Sheets-Sheet 1
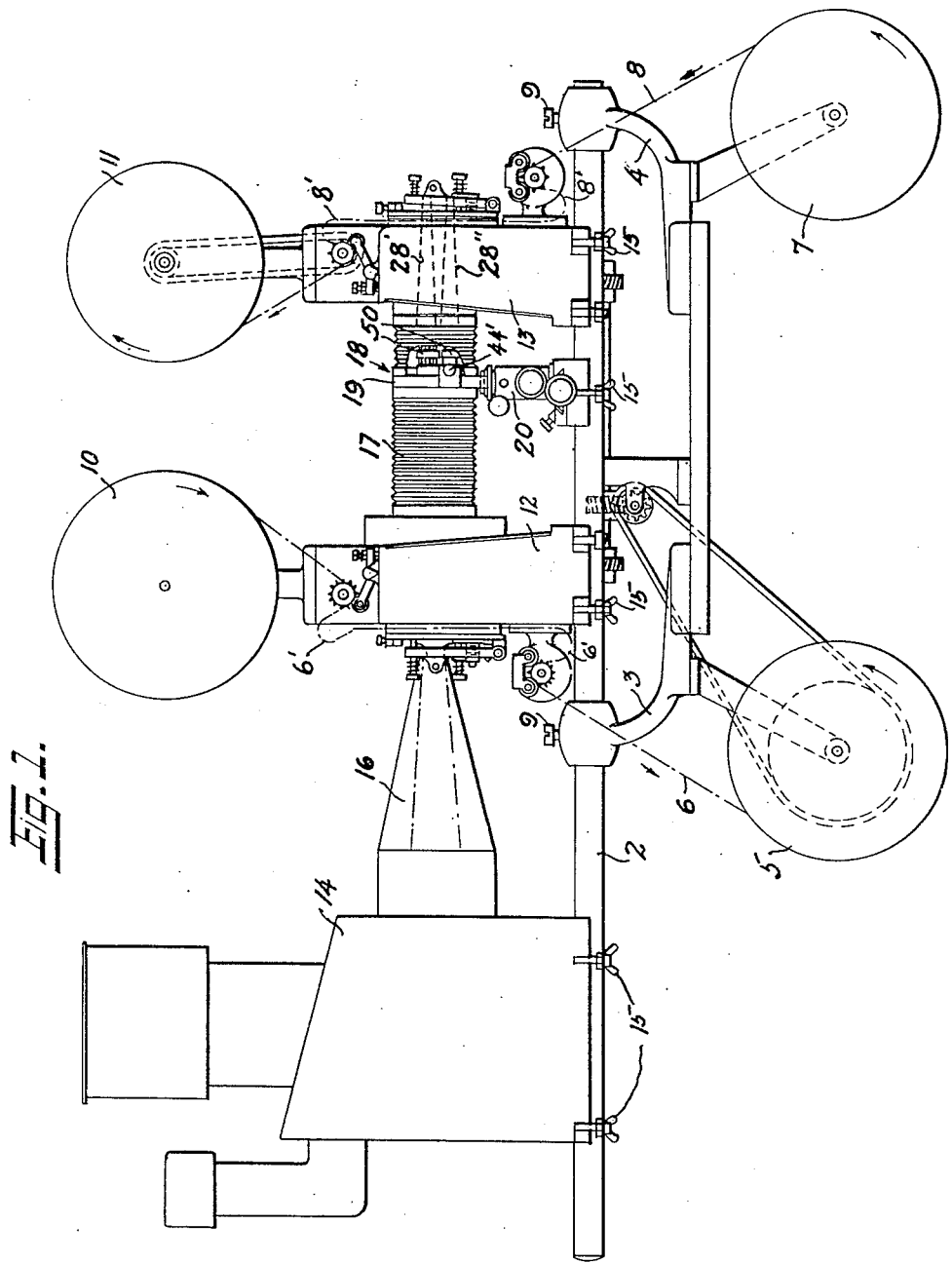
Inventor
Herbert O. Carleton
By his Attorney
Lewis J. Doolittle

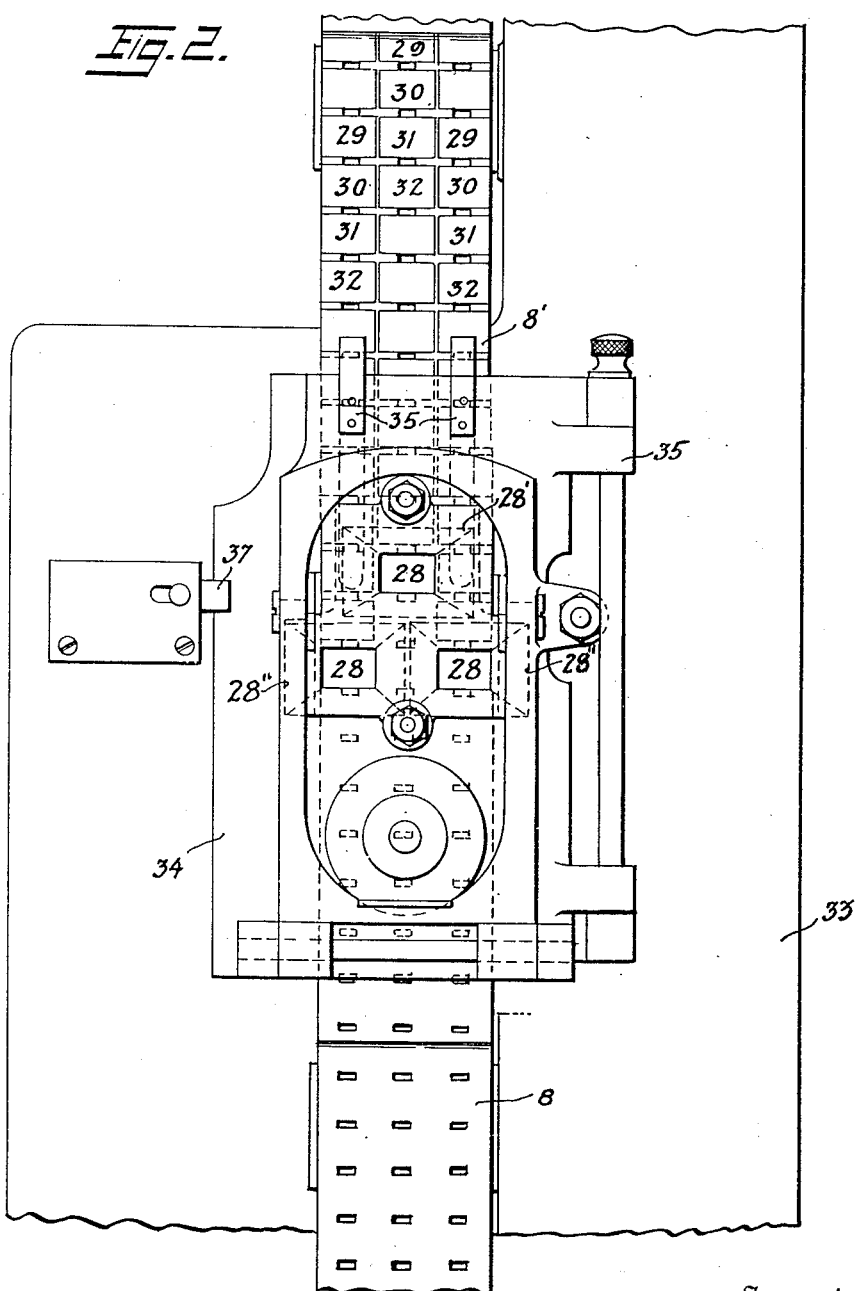

Aug. 18, 1931.     H. O. CARLETON     1,819,541
PHOTOGRAPHIC PRINTING APPARATUS
Filed Feb. 18, 1925     3 Sheets-Sheet 3

Inventor
Herbert O. Carleton.
By his Attorney
Lewis J. Doolittle

Patented Aug. 18, 1931

1,819,541

UNITED STATES PATENT OFFICE

HERBERT O. CARLETON, OF BROOKLYN, NEW YORK, ASSIGNOR TO DUPLEX MOTION PICTURE INDUSTRIES, INC., A CORPORATION OF DELAWARE

PHOTOGRAPHIC PRINTING APPARATUS

Application filed February 18, 1925. Serial No. 9,985.

This invention relates to photographic printing apparatus, and especially to apparatus of this class having means for producing on a sensitized surface a plurality of independent images similar to a single image carried by an image-bearing strip, and its main object is to provide a motion picture printing machine having a plurality of copying lenses each of which is adapted for projecting onto a sensitized film strip an independent image similar to that on an image-bearing strip movable in synchronism therewith.

An important object of the invention is the provision of apparatus for reproducing on a sensitized film strip, which may be of standard type and size, a series of groups of images, each group comprising a plurality of images reduced in size and similar to the series of images on the strip of film to be copied.

In carrying out the invention, I provide a motion picture printing machine having a plurality of lenses adapted for concurrent action, each of which lenses is adjustable toward and from the image-bearing film strip and the sensitized film strip, and two of which are adjustable in a vertical plane up and down and to the right and left.

Another feature of the invention is the provision of a system of projecting lenses so mounted as to be adapted for ready insertion and removal as a unit from the apparatus.

In the production of film strips for use in motion picture projecting machines, the practice heretofore has been as follows: First the action desired was photographed on a sensitized film strip, which was then developed, producing a series of negative images. This negative strip is then superposed upon a sensitized film strip to print a series of positive images. The positive strip thus made is a reproduction in size and number of pictures of the negative film strip and is then fed through a projecting machine to reproduce on a screen the action registered on the negative film strip, in a well-known manner.

The present invention provides means for printing simultaneously on a sensitized film strip a plurality of independent images similar to the images of which they are copies, and also consecutively printing other groups.

The invention disclosed herein is applicable to the reproduction by projection of photographic images, positive or negative, in multiple on a single surface, whether such reproduction be a reduction or an enlargement; but applicant has illustrated herein a form of his apparatus adapted for projection printing of three series of images, said images being so reduced in superficial area as to be imposed in groups of three upon a sensitized film strip of standard width. With such an apparatus a series of images carried by a film-strip of standard width may be reproduced in multiple to secure on a strip of equal width three like series of smaller images each adapted for use in a projecting apparatus of smaller size.

The features of invention previously mentioned and other features not hereinbefore referred to will be hereinafter described more fully and claimed, and are illustrated in the accompanying drawings, in which:

Figure 1 is a side elevation of a machine for reproducing photographic film strips:

Fig. 2 is a front elevation, in full size, of the film-enclosing gate and associated parts of Fig. 1, together with a strip of sensitized film enclosed thereby:

Fig. 3 is a front elevation of a portion of a photographic printing machine adapted for reproducing image strips in multiple, and Fig. 4 is a top plan view of the same, with parts broken away.

Referring to the drawings, I have shown herein, particularly in Fig. 1, the main operating portions of a motion picture printing machine for copying series of images on strips of sensitized film. It will be understood that these operating portions of such apparatus may be supported in any desired manner, and I have shown herein a guiding member or track adapted to be mounted on supporting members, said track being designed for carrying the main operating portions of the mechanism and for permitting ready adjustment of said parts back and forth thereon. Brackets 3 and 4, adjustable along said track 2, are adapted for carrying respectively the receiving spool 5 for the image-bearing film strip 6 and the supply spool 7 for a sensitized film strip 8. Clamp-screws 9 on the brackets 3 and 4 serve to permit said brackets to be fixedly secured in any desired adjusted positions on the track 2. The supply spool for the image-bearing strip to be copied is designated by 10, and the receiving spool for the sensitized strip after exposure is shown at 11, the supply spool 10 being mounted on the boxing 12 and the receiving spool 11 on the boxing 13. Any desired means may be employed for maintaining a loop or slack portion of film in advance of the printing point and another slack portion following such printing point for both the image-bearing strip and the sensitized strip, said loops being designated 6'—6' and 8'—8' respectively. Means (not shown) are employed for permitting the advance of said image-bearing and sensitized strips 6 and 8 in synchronism due to intermittent progressive motion to effect projection of the images on the strip 6 onto the sensitized strip 8. At 14 I have shown a lamp housing, which may be of any desired type and adapted to enclose a source of illumination (not shown), such as an electric lamp of any required actinic power. Said lamp housing 14 and the boxings 12 and 13 are adapted for movement along the track 2 relatively one to another, and each is provided with means, such as the clamp-screws 15, for securing said members in any adjusted positions. A bellows or equivalent device 16 is used for confining the light-rays and securing a light-tight passageway from the lamp-house 14 to the boxing 12. A light-tight passageway from the boxing 12 to the boxing 13 may be secured by the employment of equivalent means 17.

The main feature of my invention relates to the means, in an apparatus such as has been described, for projecting a plurality of similar images upon a sensitized film strip for each single image on an image-strip to be copied as the two strips are caused to move in synchronism, and I have shown herein, especially in Figs. 2, 3 and 4, instrumentalities, designated generally by 18, for accomplishing this result. In the embodiment of the invention shown herein I employ a carrying-plate 19 which may be secured to a standard 20, as by means of a pin passing through an orifice 21 in the plate 19 and through a complementary orifice in the standard 20. The carrying-plate 19 is adapted to furnish a mount for optical combinations, designated generally by 22, 23 and 24, these combinations being of such design as to furnish the proper degree of actinic power and permit correct focusing. Each of said optical combinations 22, 23 and 24, may be made up of a plurality of lenses, as 25, 26 and 27, adapted for projecting an image on a sensitized surface. With the optical combinations shown there would be projected from the image-bearing strip 6 onto the sensitized film-strip 8 during movement of said strips, three images, reduced in size and positioned to have the same relative locations on the sensitized strip as the three optical combinations have to one another, that is, the three images projected would lie triangularly disposed. As shown in Fig. 2, a consecutive group of images 30 are positioned below the group 29 and the members of the group are triangularly positioned, two of the members being displaced horizontally or laterally from the other member of the group and also being spaced below that member. With the proper adjusting movements of the boxings 12 and 13 and their focusing devices, and of the device 18, a succession of single images of the image-bearing strip 6 will be projected onto the sensitized film-strip 8 as a succession of groups of three like images, the members of each of which groups are disposed triangularly. As the instrumentalities shown are designed to print three similar images concurrently on the sensitized strip, the projected single images will each have linear dimensions approximately one-third the linear dimensions of the images on the image-bearing strip 6 to be copied. In Fig. 2 the angular disposition of images on the sensitized strip 8 is clearly shown, the film sections at the printing apertures being designated by 28, 28, 28. The disposition of other series or groups of projections, made in advance of the sections 28, 28, 28, is shown clearly in said Fig. 2, said projected images being designated by 29—29—29, 30—30—30, 31—31—31 and 32—32—32.

The means shown herein for guiding the sensitized strip 8 and for maintaining it in perfect flatness as it reaches the printing apertures 28 may be of any desired type, there being illustrated herein a locking-plate 33, and a gate 34 hinged at 35 and adapted for cooperation with said plate 33, the sensitized strip 8 passing over the surface of said plate 33 and being pressed thereagainst by springs 36 carried by said gate. A latch 37 for the gate 34 is adapted to exert the desired degree of pressure thereon and its springs 36 to press the sensitized strip 8 firmly against the backing-plate 33 while at the same time permitting progressive forward movement of said strip.

The optical combinations 23 and 24 are mounted on the plate 19 in such a manner as to be adjustable therealong and transversely thereacross as well as toward and away from said plate. Thumb-screws 38—38' adapted to be turned in the member 39—39', are held against movement in and out in said member 39 by the stop-shoulders 40—40' and 41—41', respectively. A carrying-plate 42 for the optical combination 24 has an upward projection 42'' through which the thumb-screw 38 is threaded, this construction permitting movement in and out of the plate 42, a plate 43 mounted thereon and a thumb-screw 44 when the binding-screw 45 is loosened. The thumb-screw 44, similar to 38, is threaded into the projection 43'' in order to permit adjustment of the plate 43 and its optical combination 24 in a direction transverse to that already described. When the desired adjustment in these two directions has been effected the binding-screw 45 may be manipulated to secure the parts in said adjusted positions. The optical combination 23 may be operated in like manner by the devices 38', 39', 40', 41', 42', 43', 44', 45' and 46'. In this manner the optical combinations 23 and 24 may be moved across the plate 19 in both a vertical and a horizontal direction or, in other words, independently adjusted longitudinally and transversely with relation to the film strips and to each other, and then secured in adjusted position. The optical combination 22 is shown herein as fixed against such movements, the combinations 23 and 24 being adjustable relatively thereto.

Posts 47 form supports and guides for the blocks 50 and arranged to permit inward and outward movements of the optical combinations 22, 23 and 24 to effect focusing thereof, this movement being regulated by turning of the threaded shafts 48 seated in the members 49 and turnable freely therein, said shafts being threaded through the blocks 50. As the mounts for the optical combinations 22, 23 and 24 are carried by separate blocks 50, independent movement in and out of each of said combinations may be obtained by manipulation of the proper shaft 48.

In order that the light passing through each of the combinations 22, 23 and 24 may not be dispersed and in order that there may be no conflict of light rays between the different projections, I have provided an independent light-retaining hood for each aperture located between an optical combination and its printing aperture, two of these hoods being shown at 28' and 28''.

It will be apparent that the apparatus illustrated and described herein may be used for continuous as well as intermittent printing on sensitized surfaces.

As many changes could be made in the above construction and many apparently widely different embodiments of my invention designed without departing from the scope of the appended claims, I intend that all matter contained in the above description or shown in the accompanying drawings shall be interpreted as illustrative merely of an operative embodiment of my invention and not in a limiting sense.

What I claim is:

1. In a photographic printing apparatus, the combination with a film strip having a row of consecutive images thereon and means for effecting intermittent progressive movement of said film strip and a sensitized film strip adapted for movement in synchronism with said image-bearing strip, of a plurality of triangularly positioned lenses situated between said film strips one member of which being laterally displaced in position from the other and adapted for simultaneously and consecutively projecting onto said sensitized film strip a series of groups of images, each group simultaneously projected comprising an image on the sensitized film strip and another image spaced below and laterally displaced in position on said strip, and the images comprising the consecutively projected group being positioned directly below the images of the first-mentioned group and similarly laterally displaced with relationship to each other, and means for effecting independent adjustment of each of said lenses to the right and left and up and down.

2. A photographic printing apparatus, embodying a plurality of copying lenses each adapted to project an independent image onto a sensitized surface, mounts for said lenses, guides for said mounts, blocks spaced from said guides, screw shafts fixedly secured to said guides and threadably engaging said blocks to adjustably move said mounts to focus said lenses.

3. A photographic printing apparatus, embodying a plurality of lenses each adapted to project an independent image onto a sensitized surface, mounts for said lenses, guides for said mounts, a carrying-plate for said guides having guideways thereon, thumb-screws carried by said plate and threaded into said guides for effecting independent adjustment of each of said lenses along said guideways, and clamp-screws for securing said guides in any adjusted position.

4. A plate member, another plate member slidable thereover, upwardly extending shoulders on two adjacent edges of said first-mentioned plate member, two corresponding upwardly extending shoulders on the second-mentioned plate member, guide means on said second-mentioned plate member, a lens mount slidable in the guide means, separate means extending through the shoulders of the plates to shift the upper plate laterally and longitudinally, means for securing the upper plate in shifted position, and means cooperating with the guide means for shifting the mount to focus the lens.

5. Photographic printing apparatus embodying means for synchronously advancing an image-bearing film strip carrying a single series of pictures and a sensitized film strip, a carrying plate positioned between said film strips carrying a plurality of mounts for separate optical combinations, one of said mounts being fixed in position on said plate and the other mounts movably mounted thereon and provided with means for independently varying the axial separation between each of said mounts and said fixed mount vertically and horizontally on said carrying plate, and separate fastening means for each of the said movable mounts to secure the same in their respective adjusted positions.

6. Photographic printing apparatus embodying means for synchronously advancing an image-bearing film strip carrying a single series of pictures and a sensitized film strip, a carrying plate positioned between said film strips carrying a mount for an optical combination fixed in position thereon, two movable mounts for separate optical combinations positioned on said carrying plate on either side of and below said fixed mount and provided with means for independently varying the axial separation between each of said mounts and said fixed mount vertically and horizontally on said carrying plate, and separate fastening means for each of said movable mounts to secure the same in their respective adjusted positions.

Signed at New York, in the county of New York, and State of New York, this 20th day of January, A. D. 1925.

HERBERT O. CARLETON.